(No Model.)
F. O. HANSON.
STAIRWAY.
No. 367,974. Patented Aug. 9, 1887.
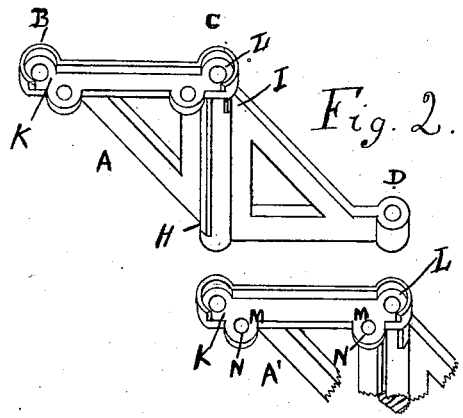
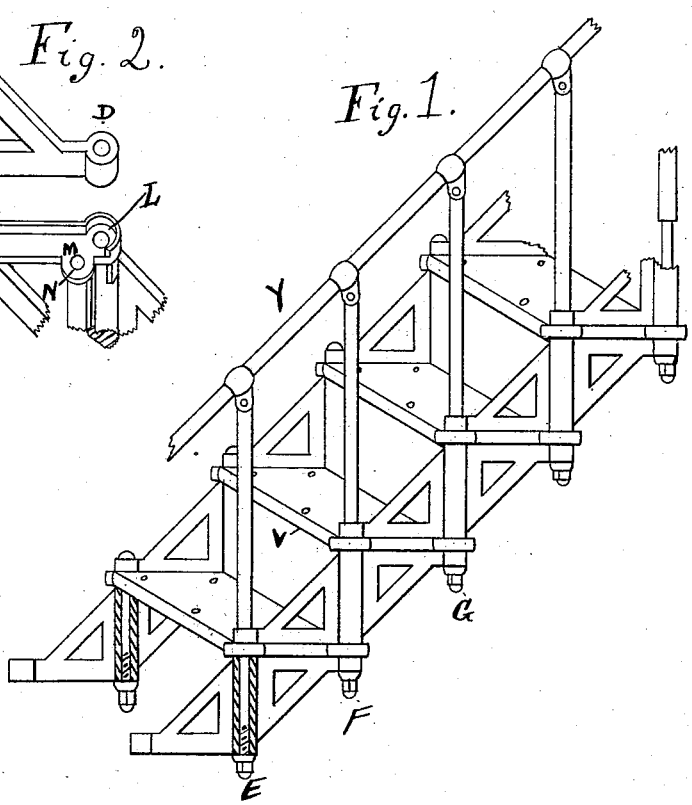
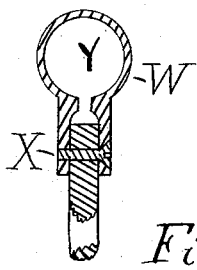
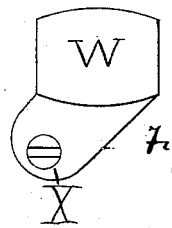
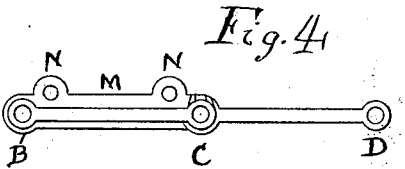
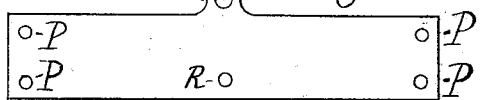
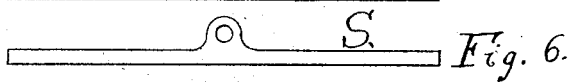
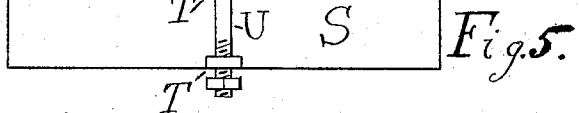
Attest
A. G. Stewart,
Frank Blard.
Francis O. Hanson,
per Leo D. Campbell,
Atty

UNITED STATES PATENT OFFICE.

FRANCIS O. HANSON, OF KENTON, OHIO, ASSIGNOR TO THE CHAMPION IRON FENCE COMPANY, OF SAME PLACE.

STAIRWAY.

SPECIFICATION forming part of Letters Patent No. 367,974, dated August 9, 1887.

Application filed July 8, 1886. Serial No. 207,497. (No model.)

*To all whom it may concern:*

Be it known that I, FRANCIS O. HANSON, a citizen of the United States, and a resident of Kenton, in the county of Hardin and State of Ohio, have invented a new and useful Improvement in Stairways, of which the following is a specification.

My invention relates to improvements in building and supporting stairways, in which the ordinary stringers or supports are done away with, the brackets that hold the step and riser forming both bracket and stringer, and the balusters serving to lock the brackets together.

Figure 1 is a side perspective view of a piece of my stairway; Fig. 2, detached perspective views of the reverse side of my brackets; Fig. 3, a side view of rail-clip; Fig. 4, a top view of one bracket; Figs. 5 and 6, top and rear views of the riser; Fig. 7, a top view of the tread of the step; Fig. 8, a rear sectional view of clip for hand-rail.

A A are my brackets; B C D, cylinder on bracket, through which bolts E F G on end of baluster pass; H, spline or feather on side of cylindrical part C; I, lug near bottom of bracket, between which and feather H the riser fits; K L, seats in which cylindrical parts B C fit; M M, seat on which the tread of the step rests; N N, holes through which and holes P P on the tread of the step the tread is bolted to the bracket; O, the tread of the step; Q R, bolt-holes in the tread for bolting the succeeding treads together and for tightening the joints between the tread and riser; S, the riser; T T, bolt-holes by means of which bolt U and holes Q R, the tread, and riser are bolted together; V, overhanging bead on the tread, between which and bolt U the riser is held; W, hinged or pivoted clip that connects the baluster and the hand-rail in a flexible manner, adjusting itself to any pitch of rail desired; X, pivot of the clip; Y, hand-rail.

The construction and manner of putting together of my stairway are as follows:

In building a stairway on the side of a house, say, a series of brackets, A A', is fastened to the wall by the usual wall-supports, each bracket being bolted by bolts E F to the succeeding bracket as the work proceeds, the brackets as they are joined together forming a seat for the tread and riser, and also as they are bolted together forming a continuous stringer. When the stringer and brackets for one side are thus formed, the bracket for the other end of the first or lower step is then put in place on the other side. The riser is put in position between feather H and lug I. The tread O is then placed in position, the bead V overhanging the riser, and the tread is bolted down through holes P Q R. Another bracket is then placed on the first bracket, the cylindrical parts B C fitting in the seats K L, when the brackets are bolted together by the bolts E F on the end of the balusters. When no balusters are used, the parts are bolted together by means of ordinary bolts having an ornamental tip that acts as a lock-nut.

When the top of the stairway is reached, a bracket, A, having an extension for forming the landing, is attached as the last bracket, thus forming a perfectly secure, simple, and neat stairway without the use of stringers.

To the top of my baluster is pivoted a clip, (shown in Fig. 8,) through which the handrail passes. This clip, by being pivoted, allows the rail to assume any inclination or pitch desired, the clip turning on its pivot and allowing the baluster to remain in a vertical position.

What I claim is—

1. In a stairway, the combination, with a series of brackets, A, each having cylindrical seats K L at the top and round parts B C at its bottom, arranged so that the rounded part of each bracket rests in the cylindrical part of the one below, of the balusters F, having their head-bolt extension passing through the brackets, and the nuts upon the lower end of the extensions, substantially as shown and described.

2. In a stairway, the combination, with the series of brackets A, each having the rib H and lug I upon its inner side, of the risers fitting behind the lug and in front of the lug of each pair of opposite brackets and the treads O, and the bolts securing the parts together, as and for the purpose set forth.

3. In combination with the series of brackets A, each having the rib H and lug T upon its inner side, of the risers fitting behind the lugs and in front of the ribs of each pair of opposite brackets, and the tread O, and the balusters having bolt extensions and nuts, whereby the parts are secured together, as and for the purpose set forth.

FRANCIS O. HANSON.

Attest:
HARRY W. MERZRD,
G. O. KEMPER.